(12) United States Patent
Baird

(10) Patent No.: US 9,140,570 B1
(45) Date of Patent: Sep. 22, 2015

(54) TIME-INCLUSIVE ROUTE AND TRIP PLANNING

(75) Inventor: Andrew Baird, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 837 days.

(21) Appl. No.: 13/228,049

(22) Filed: Sep. 8, 2011

(51) Int. Cl.
*G01C 21/34* (2006.01)
*G01C 21/26* (2006.01)

(52) U.S. Cl.
CPC ............ *G01C 21/3446* (2013.01); *G01C 21/34* (2013.01); *G01C 21/343* (2013.01); *G01C 21/26* (2013.01)

(58) Field of Classification Search
CPC ...... G01C 21/26; G01C 21/34; G01C 21/343; G01C 21/3466
See application file for complete search history.

(56) References Cited

U.S. PATENT DOCUMENTS

| | | | |
|---|---|---|---|
| 5,948,040 A * | 9/1999 | DeLorme et al. | 701/426 |
| 6,119,065 A * | 9/2000 | Shimada et al. | 701/533 |
| 6,317,686 B1 * | 11/2001 | Ran | 701/533 |
| 6,421,605 B1 * | 7/2002 | Steiner et al. | 701/533 |
| 6,581,001 B1 * | 6/2003 | Katsuka et al. | 701/424 |
| 7,266,376 B2 * | 9/2007 | Nakagawa | 455/456.1 |
| 2001/0044693 A1 * | 11/2001 | Gotou et al. | 701/202 |
| 2002/0077746 A1 * | 6/2002 | Zuber et al. | 701/209 |
| 2002/0082771 A1 * | 6/2002 | Anderson | 701/209 |

* cited by examiner

*Primary Examiner* — John Q Nguyen
*Assistant Examiner* — Michael Ng
(74) *Attorney, Agent, or Firm* — Novak Druce Connolly Bove + Quigg LLP

(57) ABSTRACT

Timing information and deeper trip planning can enhance conventional mapping functionality. A user provides a specified time of arrival and/or departure information along with a starting and end point, and receives a travel route with estimated arrival and departure times based on time-specific information, such as traffic or construction at specific times of day. The user can choose or be prompted to add one or more waypoints along the way. The user can get recommendations for hotels, restaurants, points of interest, and other such locations based on location, time of day, travel time, or other such aspects. Upon selecting a waypoint, the amount of time the user will be at that waypoint and the additional driving time are used to adjust one or more other times of the trip, such as the starting or departure times, or times of other waypoints.

25 Claims, 10 Drawing Sheets

- prior art -

TIME-INCLUSIVE ROUTE AND TRIP PLANNING

BACKGROUND

Many people utilize computer-based mapping applications to obtain directions to various locations. A person typically inputs a starting point and a destination, and obtains one or more route options. Upon selecting a route, or obtaining a single route, the user can also receive directions for the route and a graphical representation of the route, along with a length of time that the route will take. The person is not able to enter a time that the user intends to leave the starting point, or a time at which the user desires to arrive at the destination. Conventional approaches provide a predicted length of time of the route, but do not offer actual departure and arrival times. If a person has an appointment at 1:15 p.m. and the trip is estimated to take 79 minutes, the person must figure out when the person must leave, which can be a potential source of error or confusion. Further, the time of day can affect the overall length of the trip. For example, going through a downtown of a major city during rush hour can take a significantly different amount of time than going through that city in the middle of the night. Conventional mapping approaches do not factor in this information.

Further, conventional mapping approaches do not provide for a deeper level of trip planning when getting information for a lengthy trip. For example, a person might plan a trip from Seattle to Los Angeles that may take about twenty hours. A conventional mapping approach will provide continuous directions to Los Angeles, without factoring in that the person might want to split the trip over two or three days, and might want to stop at various points along the way. If a person wants to obtain directions to hotels, restaurants, points of interest, or other such locations, the person typically must use a separate application to obtain the location of any of these stops and then manually obtain directions to each of these stops. Even when a mapping application enables a user to add a waypoint, the directions do not provide timing information or break up the trip according to how the user will actually follow the route.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to obtaining directions or route options, planning trips, or obtaining other such navigation-related information. In particular, various embodiments utilize a time-based approach that provides a user with at least start and end times that enable the user to quickly determine when the user should leave to arrive at a certain time, or when the user will arrive at a destination based upon the time at which the user intends to leave. The determination of the estimated times can take into account information such as the time of day and day of the week, in order to account for variations in traffic levels, construction information, and other such potential variations.

Further, an application or service in accordance with various embodiments can provide a deeper level of planning for various navigation, mapping, or trip-related aspects. For example, an application can prompt and/or enable the user to specify whether the user would prefer to split a trip over multiple days, and can provide suggested hotels or stopping places during the trip. Further, time information can be updated to take into account any stops, including estimated arrival and departure times at various waypoints. Further, based on aspects such as trip length, time of day, or other such information, an application or service can enable a user to specify the desire to stop at one or more restaurants, gas stations, points of interest, or other such locations, and can automatically add these locations to the trip plan and update timing information accordingly.

Various other uses, mechanisms, and approaches are discussed and suggested herein as are described with respect to the various embodiments.

Figure 1:
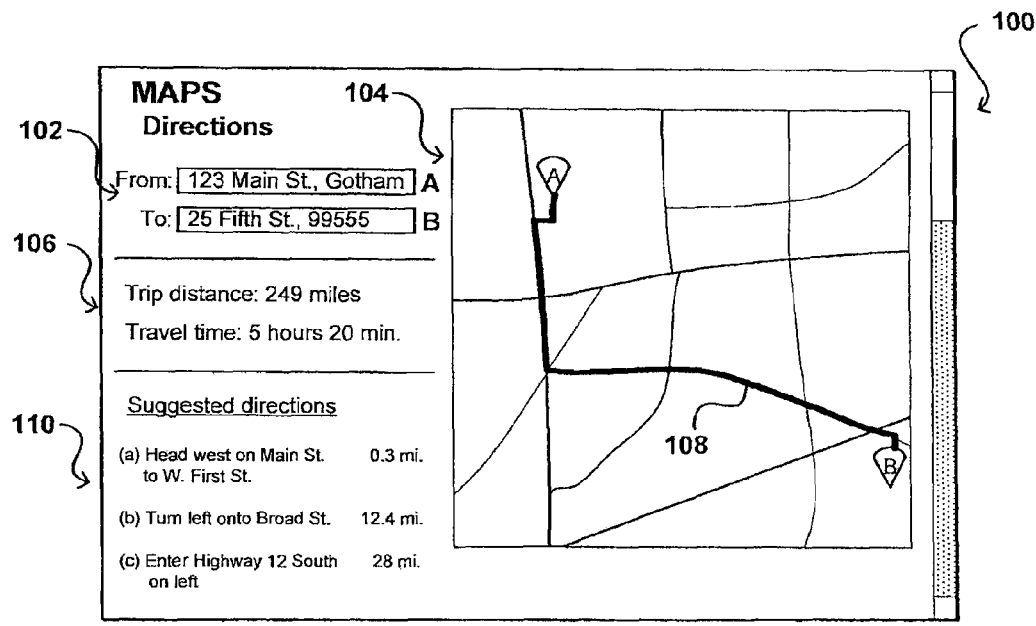
FIG. 1 illustrates an interface for a mapping application of the prior art.

FIG. 1 illustrates an example interface page 100 of a conventional mapping application of the prior art. In this example, a user is able to enter a starting location and an ending location using one or more user-accessible elements 102, and in response the user is provided with a map 104 showing a suggested route 108 between the specified starting point and destination. The user is also provided with information 106 relating to the route, including a total distance of the suggested route and an average or estimated time to travel the route. The user can also be provided with directions 110 for following the suggested route as known in the art.

As mentioned above, such an application provides only basic information that might not be accurate and/or detailed enough for many situations and/or users. For example, the actual travel time can vary greatly depending on the time of day or day of the week in which the user is intending to travel the route. Further, the application does not enable the user to enter a time in which the user wants to leave and/or arrive, such that the user might have to figure out when the user has to leave in order to arrive at a particular time, or when the user will arrive based on when the user plans on leaving. Further, based on the length of the trip the user might have to stop for gas and/or at least one meal, and there is no allowance for these stops in the timing of the trip, even where the application might enable a user to manually add one or more additional stops or waypoints along the trip.

Figure 2:
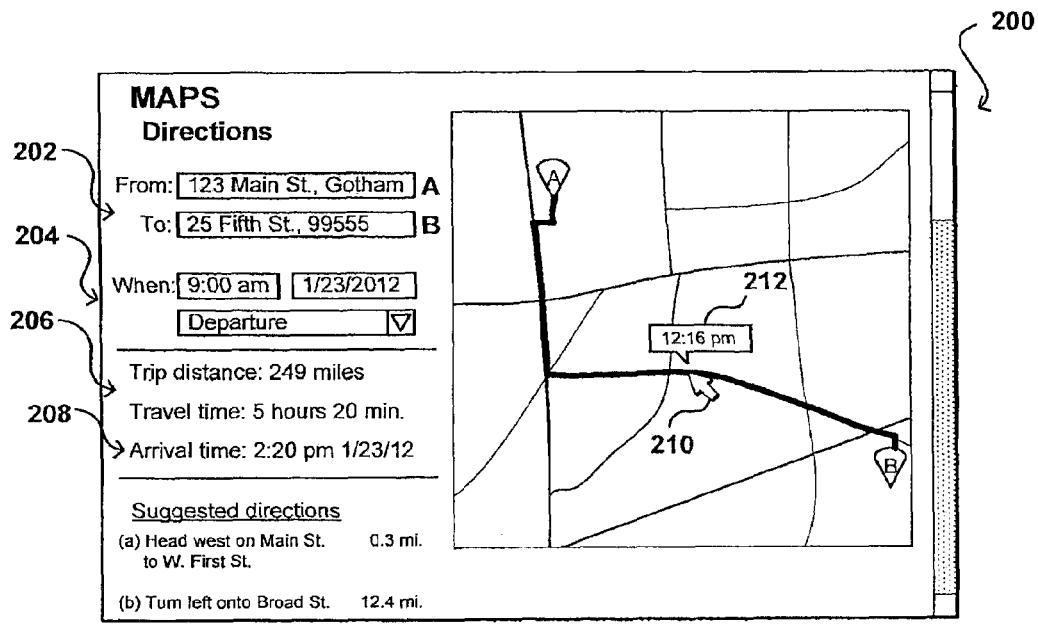
FIG. 2 illustrates an example interface for a trip planning application that can be provided in accordance with various embodiments.
Figure 3A:
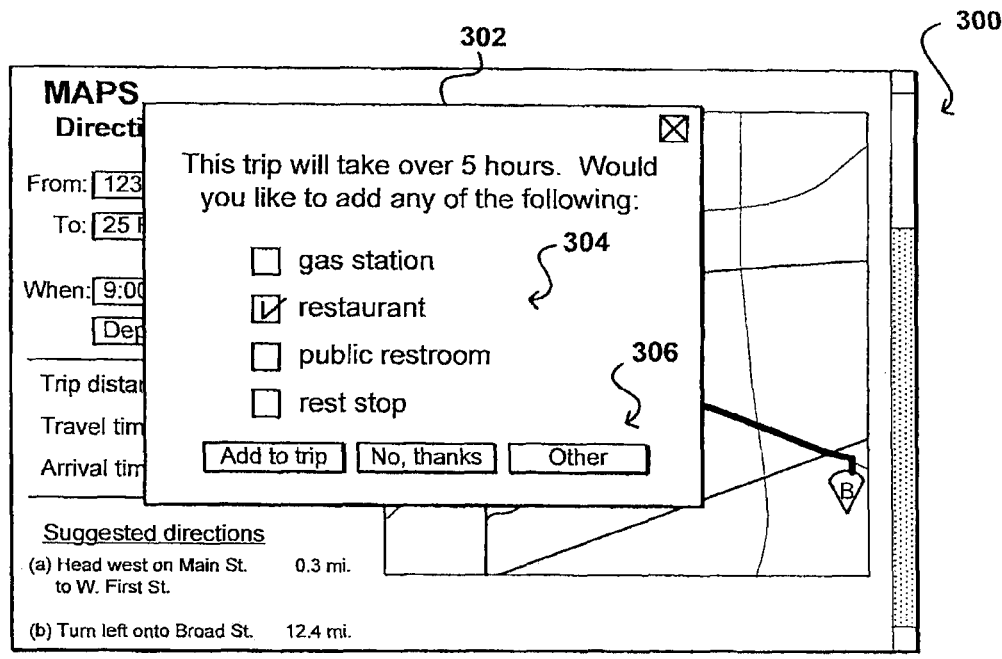
FIGS. 3(a), (b), (c), and (d) illustrate pages of an example interface for a trip planning application that can be provided in accordance with various embodiments.
Figure 3B:
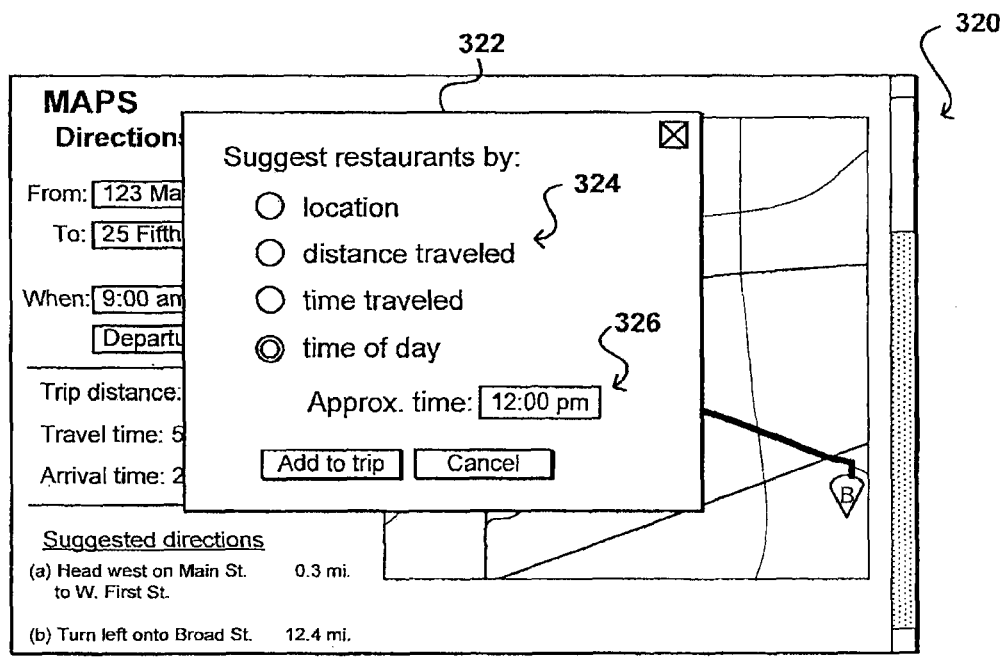
Figure 3C:
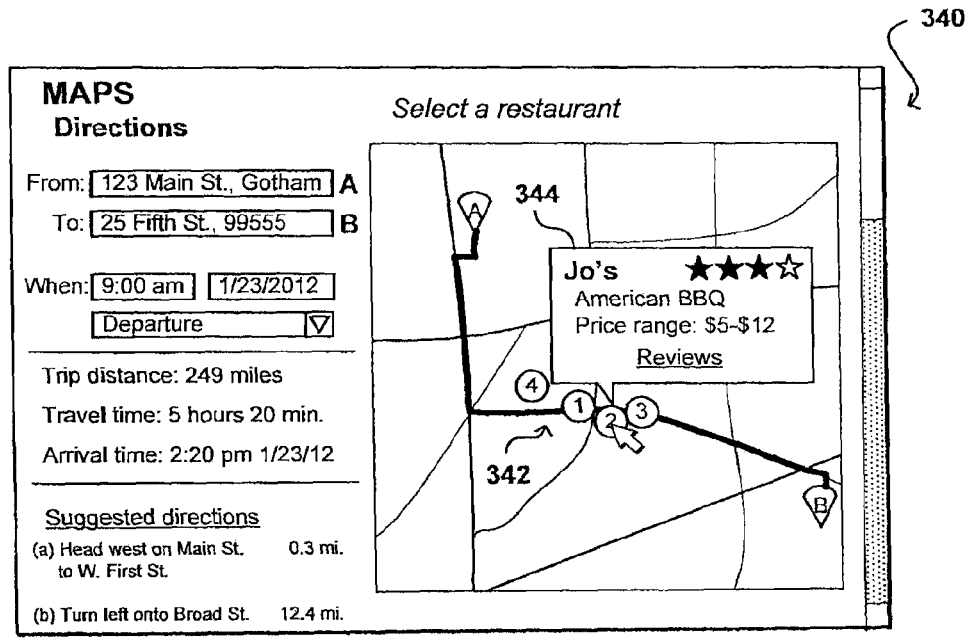
Figure 3D:
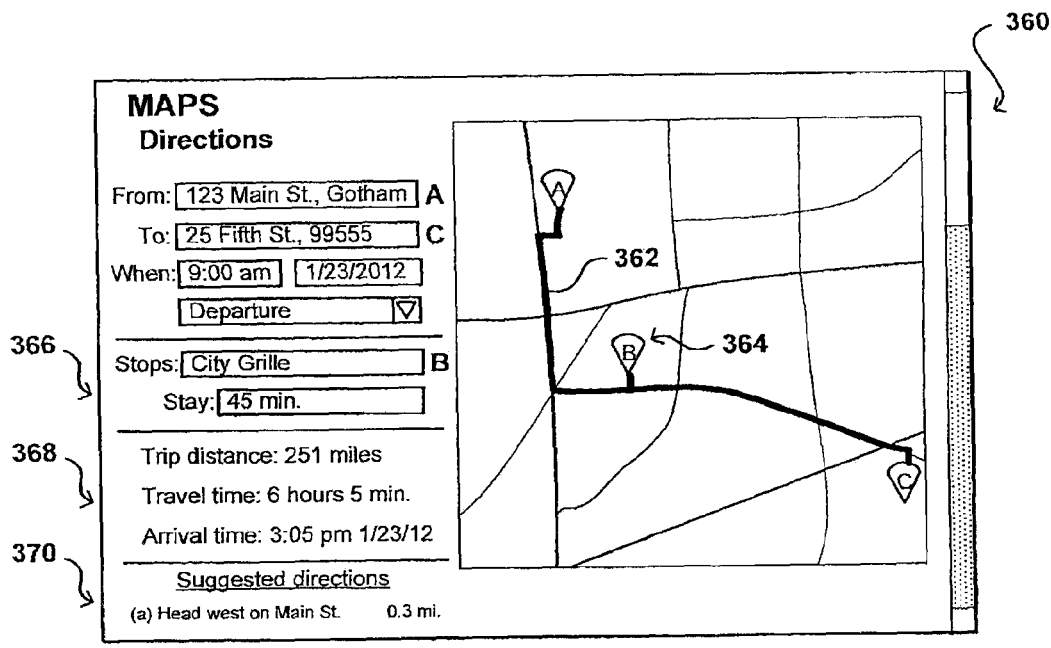

FIG. 2 illustrates an example interface 200 for a mapping and/or route planning application that can be provided in accordance with various embodiments. In this example, a user is also able to specify a starting location and an ending location using one or more user-modifiable elements 202. As known in the art, these locations can be specified using any appropriate information, as may include addresses, geographic coordinates, location names, etc. In addition to the endpoints of the trip, the user is also able to enter timing information 204 for at least one of the endpoints. In this example, the user has specified that the user intends to depart from the starting point at around 9:00 in the morning on January 23. The application might provide information 206 similar to that that of conventional applications, as may include the trip distance and travel time. Based at least in part upon the timing information provided by the user, however, the interface is also able to provide to the user information such as an estimated time of arrival 208, here 2:20 pm on the same date. The estimated time of arrival can be beneficial to the user, as the user can adjust the time of departure as necessary, or at least can be aware of the approximate time of arrival if following the determined route. Further, the timing information can be used to provide more accurate travel time information in at least some embodiments, as an application or service can determine a more accurate travel time based on average rates of speed or travel times based on the time of day, day of the week, scheduled construction, and other such information.

As can also be seen in the example interface 200, a user can obtain timing information at various points along the trip. For example, the interface in FIG. 2 illustrates the route 210 on the provided map. If the user selects a point along the route, such as by pressing on a touch screen, hovering a cursor over a location, or providing another such input, the user can obtain an estimated time 212 when the user will arrive at a specific location. Such information can be valuable to a user, as the user can determine whether a particular location will be open when the user passes by, can determine where to stop for a meal based on the predicted time, etc. In some cases, a user might determine that the user will be passing through a high-traffic area during rush hour, and might adjust the departure and/or arrival times in order to avoid rush hour traffic at that location, or might select a route that does not take the user through downtown. In some embodiments, the application or service might route the user around downtown automatically if the user is determined to be passing through downtown during a high traffic time, where another route would be faster based on the time of day. Such information or ability is not provided by conventional route planning applications without timing information.

As mentioned, conventional approaches to determining trip length can analyze factors such as the speed limits along various sections of roadway for a determined route. When time of day and day of the week information is known, as well as holiday, construction, or other such information, an application or service can instead consider the average or estimated speed at which the user will actually be able to travel at various stretches along the route, which can improve the accuracy of the predicted trip length and can enable providing relatively accurate departure and/or arrival times. Similarly, information such as the length of stop lights (which can also vary with date and time) along the way and other such information can be incorporated as well within the scope of various embodiments. If available, driving patterns of a particular user can also be factored into the timing information.

In situations such as that described above with respect to FIG. 2, the length of the trip might be indicative of the desire of a user to stop at least once during the trip. For example, the five hour and twenty minute trip discussed above might be long enough that the user will likely want to make one or more stops. The amount of time and number of stops suggested can vary between embodiments, and can be based upon various factors such as typical behavior of a number of users or the specific behavior of a respective user. FIG. 3(*a*) illustrates an example interface 300 wherein a display element 302, such as a modal window or popup, can be rendered or otherwise displayed to a user to enable the user to provide information about one or more stops that the user might want to make along the route. In FIG. 3(*a*), there are a number of types of stops 304 displayed from which the user can select. For example, the user might want to select a stop at a restaurant and a gas station, among other types of locations. The selection of location types presented in at least some embodiments might be based upon the length of the trip and/or the starting or arrival time. For example, a trip of less than an hour might not generate any suggestions, while a trip of ten hours or a trip with an overnight portion might generate a suggestions for hotels. The user in at least some embodiments can select one or more of these suggestions, or in some cases can select an option 306 that enables the user to enter another type of stop, such as a museum, water park, etc.

In the example of FIG. 3(*a*), the user indicates that the user is interested in adding a stop at a restaurant along the route. In some embodiments, the user might be able to input or otherwise specify a certain restaurant or location. In the example of FIG. 3(*b*), the interface 320 can prompt the user to specify additional information about the restaurant stop, such as by selecting an option 324 to recommend a restaurant based on the time of day, distance traveled, amount of time traveled, location, etc. If the user wants to stop around a particular time, the user can manually enter a preferred time in a text box 326 or other such user element. Various other approaches could be used as well, such as enabling the user to select an approximate location on a map, enter a type of food or name of a restaurant chain, etc.

FIG. 3(*c*) illustrates an example interface 340 wherein the user has selected an option to obtain restaurant recommendations. In this example, a number of options are displayed on a map near an approximate location along the route 342, such as near a location where a user will pass at a certain time. The user is presented with the location of various suggested restaurants, which might be selected based solely on location or might utilize additional information as well, such as user preferences, specified criteria, and the like. In this example, the user is able to obtain more information about each restaurant, such as by hovering a mouse over an icon for the restaurant, whereby information 344 for that restaurant is displayed. The information can include any appropriate information, such as the name and type of restaurant, reviews, links to a menu, and other such information. If the user finds a restaurant of interest, the user can select the restaurant by clicking, double-clicking, pressing on, or otherwise selecting an element associated with a restaurant.

The information for the restaurant stop then can be used to update the trip plan. For example, FIG. 3(*d*) illustrates an interface 360 wherein the restaurant has been added as another stop 364 along the route 362 between the specified endpoints. Information for the stop 366 can also be displayed, such as a name of the restaurant, location, etc. In this example, the stop is given a default duration of time that the user is expected to be at the restaurant. This duration can be determined or selected using any appropriate criteria, such as a type of restaurant, historical user behavior, etc. In this example, the user can also adjust the amount of time the user expects to be at the restaurant. For example, a default amount of time might be 45 minutes, but if the user will be in a hurry to get to the destination the user might adjust the amount of time to a shorter period of time, such as 30 minutes. The amount of time to get to the restaurant from the prior route, as well as the period of time the user expects to be at the restaurant, can be used to update the route timing information 368, such as to set the distance and length of the trip, as well as to adjust the timing of the arrival and/or departure. Various other times can be updated as well based on the time for the additional stop, such as times for other stops along the route. The directions 370 can also be automatically updated to include the stop at the restaurant.

Figure 4A:
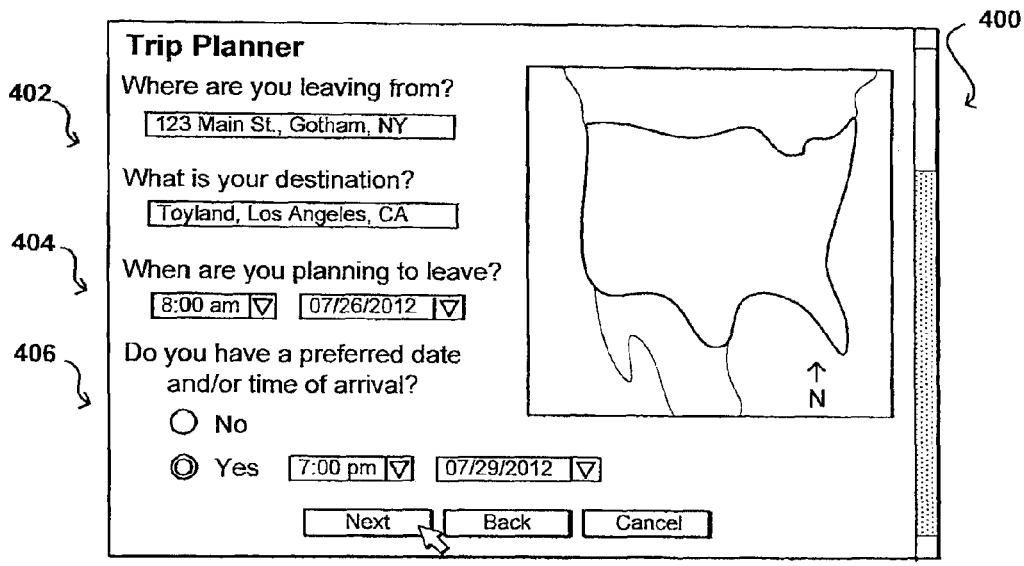
FIGS. 4(a), (b), (c), (d), and (e) illustrate pages of an example interface for a trip planning application that can be provided in accordance with various embodiments.

Various other approaches to trip planning can be provided as well within the scope of the various embodiments. For example, FIG. 4(a) illustrates an interface page 400 whereby a user can begin entering or otherwise specifying information to be used in planning a trip or other such journey. As with other approaches discussed herein, the interface can be generated by an application running on a computing device of the user, running on a remote application server accessed by the user computing device, accessed through a Web browser, or using any other such approach known or used for providing user interaction.

In the example of FIG. 4(a), a user is able to specify a starting point 402 and an ending point 404 for the journey. The user is able to specify a time and/or date 404 when the user is planning to leave from the starting point. The user can also select an option 406 to specify whether or not the user has an preferred date and/or time of arrival at the destination. For example, the user might want to take three days to get to the destination and arrive at, for example, the evening of the third day. The user can have various options, such as to input a target time or a range of times (such as afternoon or evening). In some embodiments, the user might not enter a target time of arrival, and might instead wait for the results of the trip plan, whereby the user can be provided with the estimated time of arrival based on the trip plan. It should be understood that, as discussed above, in some embodiments a user might instead enter a target time of arrival but not an intended time of departure, whereby the user can be provided with an estimated time that the user would need to leave based upon the desired arrival time and trip plan.

Figure 4B:
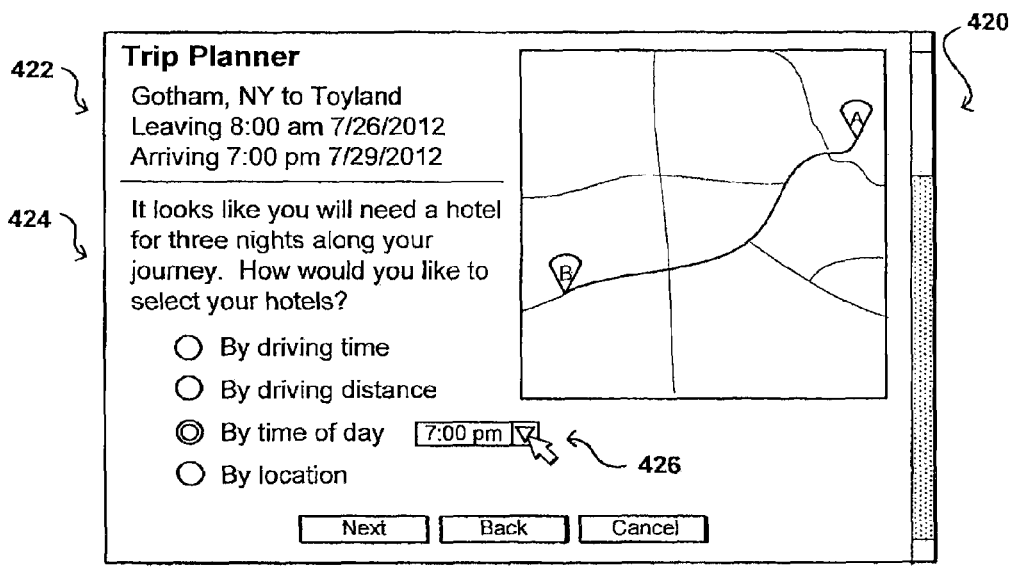

The information provided via the interface of FIG. 4(a) can be used to generate a subsequent interface page or screen 420, for example, as illustrated in FIG. 4(b). The trip planning application in this embodiment walks the user through setting up a trip plan based on any of a number of types of information, such as trip length, user preferences, historical information, etc. In FIG. 4(b), the user is provided with current trip information 422 based on the information obtained for the user trip so far, and is prompted to enter additional information to assist with the trip plan. In this example, the interface indicates that the current trip plan will cover three nights, and prompts the user 424 for at least one approach to be used in suggesting hotels. For example, a user might not want to drive more than eight hours a day, or might want to stop driving by 7:00 p.m. each day. In other situations, a user might prefer to stop in specific locations along the route. In this example, the user has selected an option 426 to suggest hotels based upon the user's desire to stop driving by around 7:00 p.m. each day.

Figure 4C:
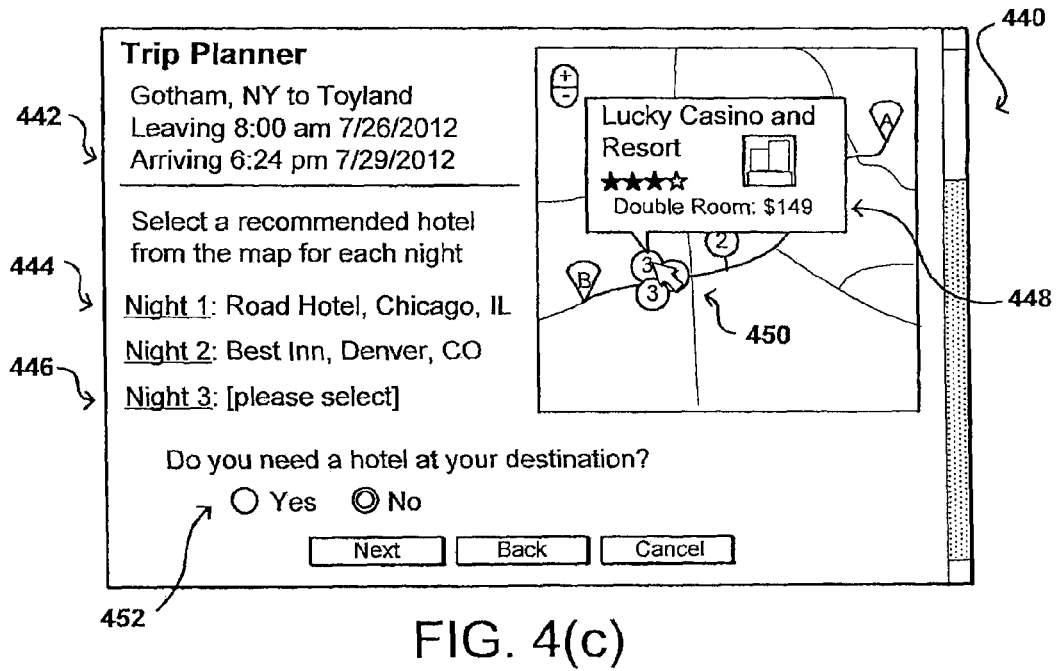

Based at least in part upon the specified user information, a subsequent interface page 440 is generated for the user, as illustrated in FIG. 4(c), that suggests hotels based on where the user will be each day at around 7:00 p.m. according to the trip plan. As mentioned, if the user had instead selected a specific amount of driving or specific locations, a different selection of hotels or sleeping establishments could have been presented. In this interface, the user is again presented with basic trip information 442 based upon the user input so far. As can be seen, the estimated time of arrival has been adjusted based upon the newly acquired information for the trip. For example, the user has selected hotels for the first two nights as indicated by the corresponding hotel listings 444. In this example, the user has not yet selected a hotel for the third night, as indicated by the corresponding listing 446. A selection of recommended hotel locations is shown on the map. The user is able to obtain information on any of these suggested hotels by, for example, causing a mouse cursor 450 to hover over an icon for that location, pressing on a location using a touch sensitive display element, or performing another such selection action. In this example, the user hovering over one of the hotel suggestions for the third night causes a modal window 448, or other such display element, to be presented that can include various information about the hotel. Other information on the page can also be updated as appropriate. For example, the trip information including the time of arrival 442 can be temporarily updated to reflect changes that would result from selecting a given hotel, as the different locations can affect the amount of driving time on the following day. The interface can provide various other options as well within the scope of the various embodiments, such as an option 452 that enables the user to include other stops as well, such as a hotel for the end of the trip, etc. The trip planner can also request information such as the time at which the user intends to leave each hotel, whether the user will eat breakfast at the hotel, or other such information that might affect one or more aspects of the trip plan.

Figure 4D:
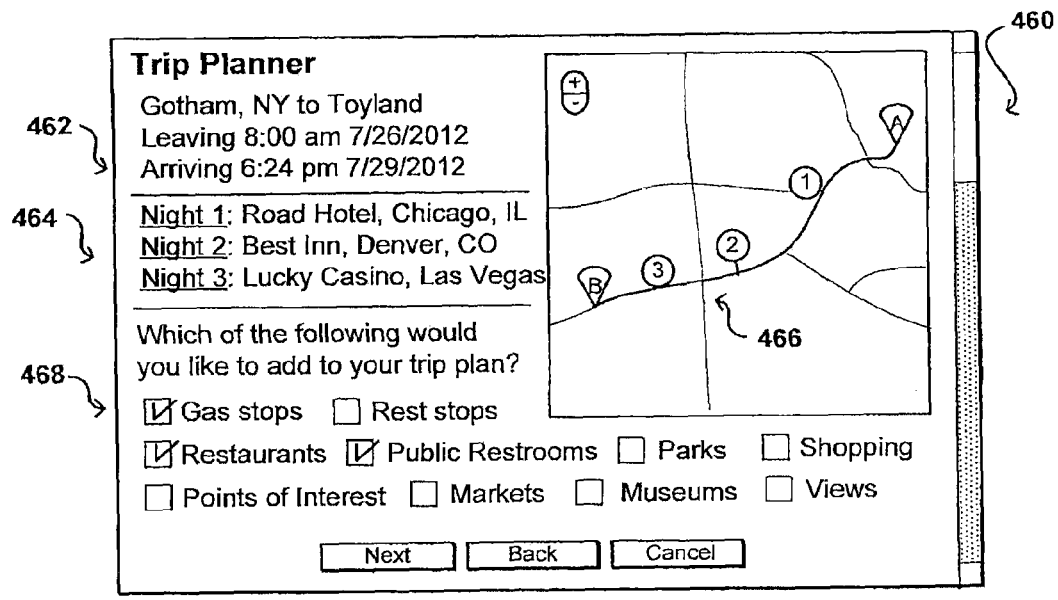

FIG. 4(d) illustrates another example page 460 or state that can be presented to a user in accordance with various embodiments. In this example, the basic trip information 462 is again presented, reflecting updates according to more recent selections. The interface page can also present information regarding the other selections, such as information 464 for each hotel selected previously. Icons or other graphical elements can be provided on a map along the route 466, representing locations where the user will be stopping, visiting, or passing through in various embodiments. The user also can be presented with one or more options 468 to include additional stops, waypoints, or other such locations along the route. While checkboxes are shown in this example, it should be understood that any appropriate elements, screens, or other graphical elements can be used to obtain such information.

In some embodiments, users might not care about taking the time to select gas stations, restroom breaks, and other such locations, such that the user can skip such selections and obtain a trip plan that includes the basic information and a general estimate of timing. For users who prefer more accurate timing information and/or want to make sure that they determine appropriate facilities before they leave, the application can enable a user to specify a number of different types of stops. For example, a user might want to get recommendations for restaurants along the trip. The restaurant recommendations might be provided using a process similar to that discussed above with respect to hotels, whereby a user can specify criteria such as an approximate time of day, amount of driving, or location for use in suggesting specific restaurants. A user then can select one or more restaurants to be added to the trip, along with an estimated amount of time that the user will be at each restaurant. Each restaurant might have a default amount of time, such as 15 minutes for fast food restaurants (or 5 if the user selects a drive-thru option) or an hour for sit down restaurants, which the user can then adjust as desired. For each restaurant, the application can update the directions and timing information, including the amount of time the user expects to be in each restaurant.

As illustrated in FIG. 4(d), the user can also select various other stops or waypoint options 468 as well. For example, the user can select to include gas stations along the way to ensure that the user does not run out of gas, to attempt to stop where gas has the lowest price, to attempt to stagger stops to stretch the user's legs, or for any other such reason. Similarly, a user might want to add rest stops, public restrooms, or other stops for various reasons. In addition to these types of "known" stops, however, the user can also select various options to obtain suggestions about other interesting stops that might be along or near the route, of which the user may or may not be aware. For example, the user might select options to receive suggestions for points of interest, museums, scenic overlooks, shopping areas, or other such locations. The user might then receive a listing, display, graphical selection, or other representation of any such locations along the way. This might help the user make the most out of the user's trip, as the user might be planning to drive along a specific route, such as Route 66 or the Pacific Coast Highway, but might not know what there is to see along that route. By providing suggestions, the user can determine ahead of time which sights the user wants to visit, and can ensure that the user has enough time to visit these sites. If the user will not have enough time, the user can select the sights that the user most wants to visit within that time. Such an approach is advantageous over manually searching for information or visiting sights as the user comes upon them, as the user might then run out of time and not be able to visit a sight towards the end of the trip that might have been of more interest to the user. Various other advantages can be provided as well within the scope of the various embodiments.

Figure 4E:
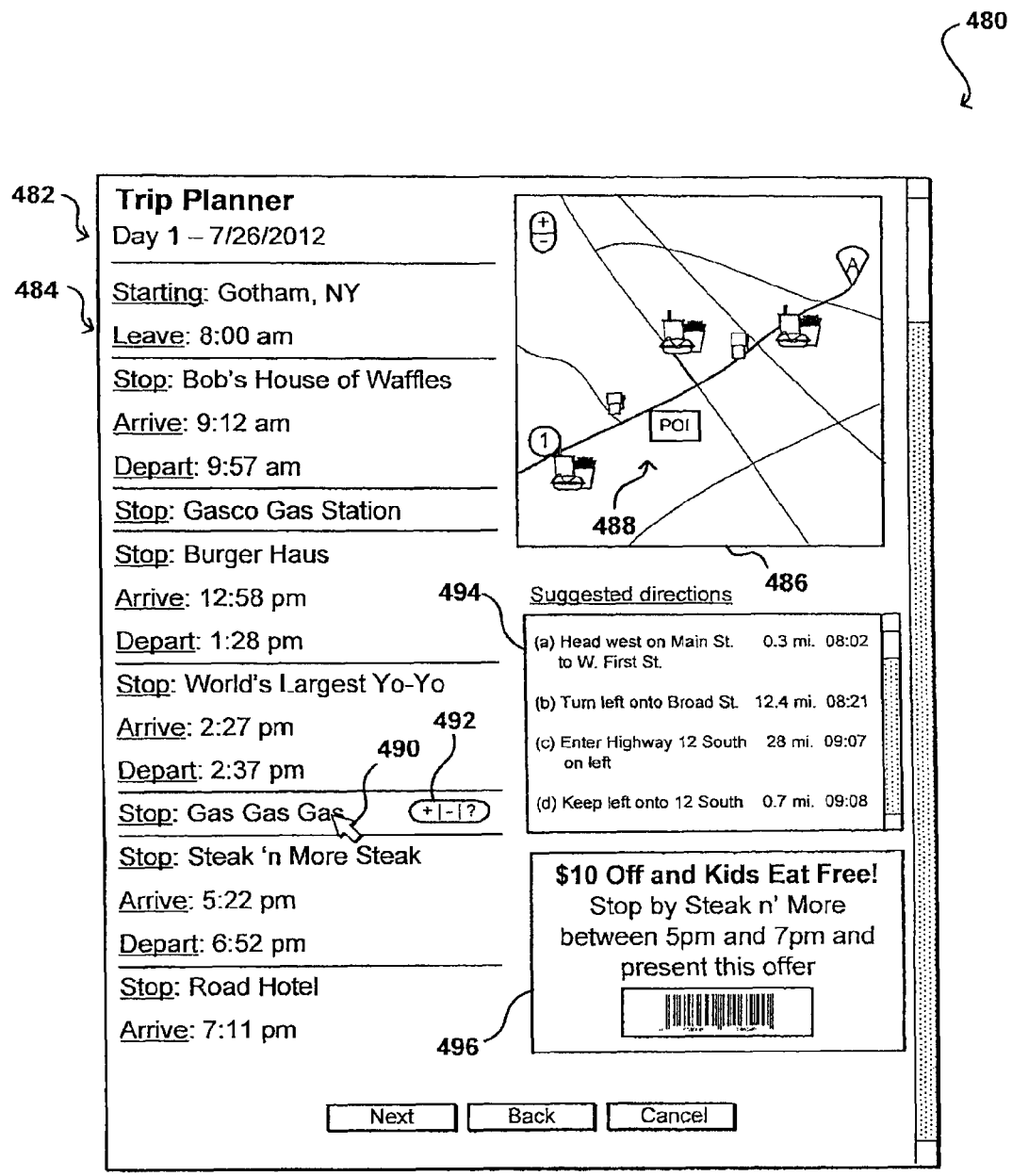

FIG. 4(e) illustrates an example interface display 480 that might be presented to a user after the user inputs information for a trip plan in accordance with one embodiment. This display can be presented to the user upon completing the plan, while accessing the plan via a computing device at a time after the trip plan is completed, and/or while utilizing a computing or navigation device during the trip. In this example, the user is able to pull up a detailed plan of each day, portion, or other segment of the journey. Information regarding the selected portion 482 can be displayed, along with the details 484 of the relevant stops during that portion, including timing information. For example, the information includes three stops for meals, including approximate times of arrival and departure for each, along with two stops for gas, a stop at a point of interest, and an estimated time of arrival at the hotel for the evening. The example interface also provides a map 486 showing the route 488 for that portion of the journey, including icons or other graphical indicia of each stop along the way. The user can have the ability to zoom, shift, or otherwise manipulate the map as known in the art for electronic mapping applications. The interface also displays directions 494 to be followed by the user. If the user is accessing the instructions during the trip, the directions can be updated based on the current location of the user and other such information.

In this example, the user is able to select one of the stops using an approach such as touching a pressure-sensitive display element or hovering a cursor 490 over information associated with that stop. The user can click on a link or other graphical element to access information about the stop, and potentially change information using an approach similar to that discussed elsewhere herein. In this example, a user-selectable element 492 might be displayed when the user hovers over a stop, enabling the user to quickly adjust information such as to increase or decrease the amount of time for the stop, delete the stop, or perform other such actions. For more detailed adjustments, the user might be able to select a link for that stop which will popup another window enabling the user to update information. Various other approaches can be used as well within the scope of the various embodiments.

In at least some embodiments, the interface can also display various advertisements 496 or other offers relevant to the trip. In some embodiments, the user might specify to receive (or not receive) offers for various establishments along the route, which might include stops already indicated for the trip (e.g., restaurants or amusement parks) or other locations that might be of interest to the user. In some embodiments, the advertisement might be selectable by the user, whereby a relevant stop can be automatically added to the trip plan and timing information updated accordingly. In some embodiments, selecting an offer might replace a stop of the trip, such as to replace a restaurant for lunch or a point of interest. The user can have the ability to add, delete, or replace various stops in response to an advertisement. The ads displayed can be selected based on other information as well, such as user preference information, historical interest of the user, types of stops along the route, and other such information. It should be understood that there can be various other types of information and offers displayed as well within the scope of the various embodiments. For example, information about each stop might be displayed, such as an electronic brochure, historical information, and the like. Similarly, offers presented to a user might suggest items useful for the trip, such as books on one or more stops, items useful at those stops (e.g., hiking boots for a national park or snorkeling gear for a beach), etc.

Figure 5:
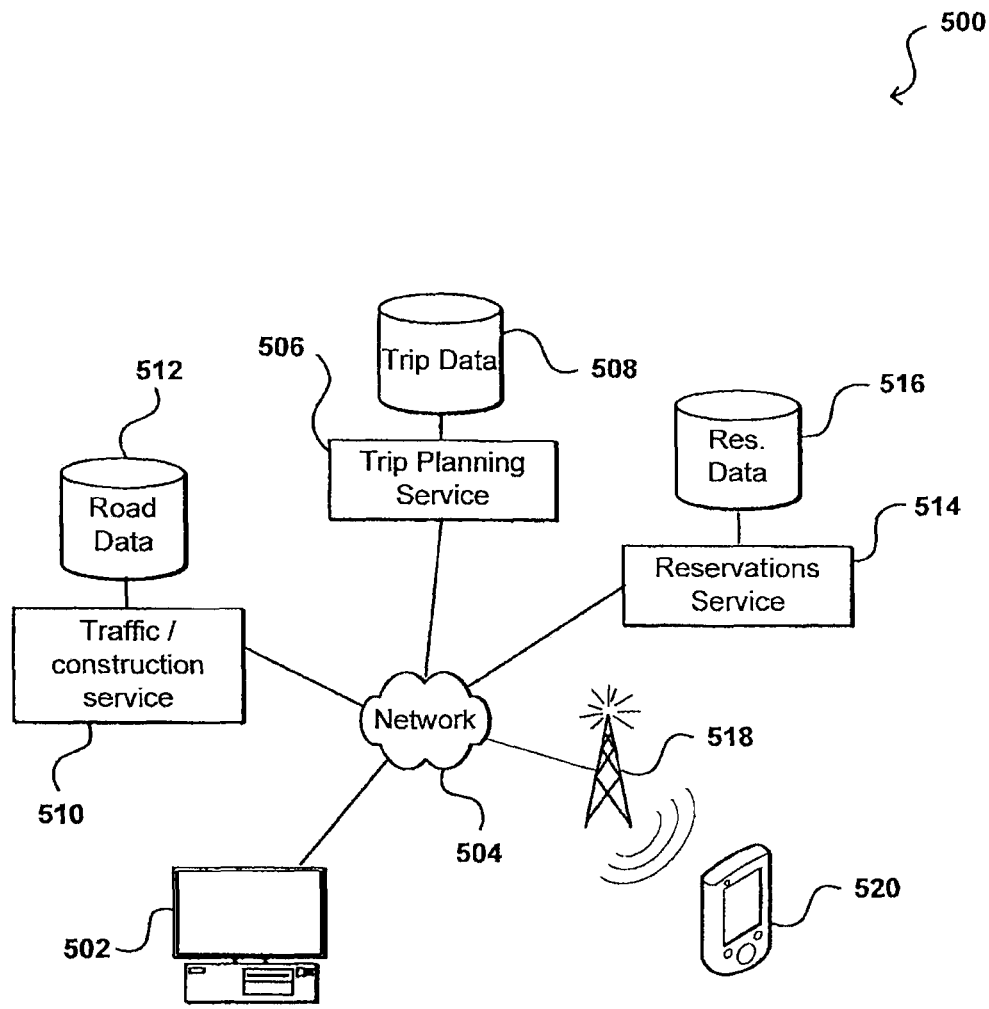
FIG. 5 illustrates an environment in which various aspects of a trip planning service can be utilized in accordance with various embodiments.

The information for a trip plan can be obtained, suggested, displayed, and otherwise accessed or manipulated using a system 500 such as that illustrated in FIG. 5. It should be understood that the example system is a general overview of basic components, and that there can be many additional and/or alternative components utilized as known or used in the art for the generation, transmission, processing, management, and/or storage of electronic information. In this example, a user is able to utilize a client device 502, such as a personal computer, tablet computer, smart phone, and the like, to access a trip planning service 506 over at least one appropriate network 504, such as a cellular network, the Internet, or another such network for communicating digital information. In some embodiments, a trip planning application might be installed on the client device 502, such that much of the planning, information gathering, or other such aspects can be executed on the client device, while the trip planning service 506 is contacted primarily to obtain trip data from at least one trip planning data store 508, store user data, and perform other such tasks. In other embodiments, the user might access a Web page or similar interface through a browser or other interface on the client device 502, whereby requests are submitted across the network 504 to the trip planning service 506 and a majority of the code execution is performed by one or more servers or computing devices associated with the trip planning service. Various other interaction and execution approaches can be utilized as well within the scope of the various embodiments.

In some embodiments, a user will access a trip planning application or service through the client device 502, inputting various types of information as discussed herein to generate a trip plan. As discussed, trip planning can involve contacting the trip planning service 506 to obtain route options, directions, suggestions, and other such information to be used in planning the trip. As part of the planning, a trip planning application or service might contact a third party service, such as a traffic and/or construction information service 510, which might store current and/or future construction and/or traffic information in one or more data stores 512. The trip planning service 506 can use the construction and/or traffic information to assist in performing tasks such as selecting the best route(s) for a trip based on the expected date and time of the trip. For example, if the construction information indicates that a roadway will be closed during a particular time, the trip planning service can determine that a route should be selected that avoids that route. Further, the trip planning service can utilize traffic information to determine how long it will likely take the user to travel each leg of the journey, based on average or estimated traffic or speed rates for a given time window, for example, and can select routes that might be faster based on the time of day. For example, a route through downtown might be selected at night where that route is more direct, but an highway that goes around downtown might be selected during rush hour where the average speed of travel at that time makes it faster to use the outer highway. Various other approaches for suggesting routes based on traffic, construction, or similar information can be used as well in accordance with the various embodiments.

As discussed, the trip planning service 506 can suggest various stops or locations for a trip plan, as may include hotels, restaurants, museums, and other such places. In at least some embodiments, the trip planning service can work with at least one other third party service or provider, such as a reservations service 514 that is able to search for, and make, reservations on behalf of the user. For example, the user might select reservations for dinner in a town along the journey. The trip planning service might contact the reservations service 506 across the network 504 to determine, from a reservation data store 516 or other such location, which restaurants in town have availability for the appropriate number of diners at the approximate time of arrival. The trip planning service can cause this information to be displayed to the user, either directly or as part of a widget or other portion of the interface associated with the reservations service 514, whereby a user can select a restaurant at which to make a reservation. Upon making the selection, a request can be sent to the reservations service 514 that can cause a reservation to be made at the restaurant on behalf of the user. Approaches to making electronic reservations are known in the art and will not be discussed herein in detail.

When the trip plan is complete, or at any stage where at least a portion of the trip plan is determined, information for the trip can be stored to the trip planning data store 508, to the client device 502, and/or to any other appropriate location. By storing the information to a trip planning data store or other such remote location, the trip plan can be accessed over a network by another appropriate computing device. For example, the user might generate the trip plan using a first client device 502, such as a desktop computer. During the trip, or at any other appropriate time, however, the user might want to access that information using another computing device. For example, the user might want to access the trip information using a smart phone, tablet computer, or navigation system during the trip, in order to get real time directions, update trip information, or perform any other such task. In this example, the user is able to access information for the trip plan using a smart phone 520 that is able to connect to the network 504 using an appropriate connection mechanism 518, such as a cell tower, WiFi hotspot, and the like. In at least some embodiments, the user can associate a navigation system with an account of the trip planning service, for example, which enables the trip plan to be automatically pushed to the navigation system, accessed by the navigation system, etc. Such an approach is advantageous because a user can generate a complex trip plan ahead of time using an appropriate computing device, then can access the trip plan information using the navigation system during the trip without having to input each destination along the way.

Further, the ability to access the trip plan using a navigation system or location-determining computing device enables the trip plan to be updated in real time. For example, a user might make an unplanned stop, or might spend a different amount of time than allocated at a particular stop. The trip planning service can receive this information and automatically update the trip plan, including the estimated times of arrival and other such information. In some embodiments, the trip planning service 506 might notify the user if the progress of the trip might cause the user to not have enough time for a particular stop, or if the progress might want the user to change a selected stop. For example, the user might have selected a restaurant initially that was based on the user passing by that restaurant at around 7:00 p.m. If the user is now estimated to pass by that restaurant at 9:30 p.m. based on the user's current location, the service might prompt the user with such information and ask whether the user wants to select a new restaurant that the user will pass closer to the original 7:00 p.m. time frame. In at least some embodiments, the user might specify various criteria for restaurants, points of interest, and the like, and the trip planning service might update the trip plan automatically. For example, if the user selects fast food as a restaurant criterion, but does not care which fast food restaurant or which location, the trip planning service might update the trip plan to include the fast food restaurant that is closest to a target time and/or location along the trip, which might be updated due to changes in the journey, etc.

Figure 6A:
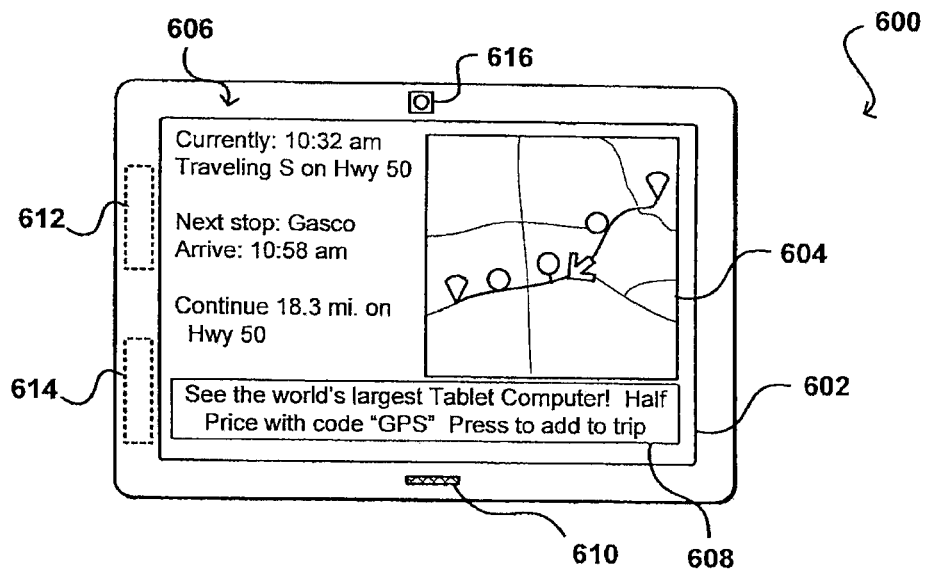
FIGS. 6(a) and (b) illustrate a front view and component view of an electronic device providing trip planning capability that can be used in accordance with various embodiments.

During the course of the journey, the computing and/or navigation device utilized by the user can update the directions for the trip plan in near real time, using any approach known or used in the art for such purposes. For example, FIG. 6(*a*) illustrates a front view of an example computing device 600 that can be used to access trip information and receive directions in accordance with various embodiments. The computing device can be any appropriate device, such as a standalone navigation system, smart phone, tablet computer, and the like. The computing device can also be the same, or a different, device than was used to establish the trip plan. In this example, the device is able to display a map 604 and directions 606 on a display element 602 of the device. The device can have one or more image or sensor elements 616, such as a camera, light sensor, or other such element for determining information about the environment, gesture input from a user, etc., and at least one speaker 610 or audio output element for providing "spoken" directions to the user so the user does not have to look at the device while driving. Various other inputs, outputs, and uses can be provided as well within the scope of the various embodiments.

The example computing device 600 also includes at least one position-determining mechanism 612 for use in determining a present location of the computing device. This mechanism can be any appropriate mechanism known or used in the art for such purposes, such as a GPS device or cellular connection mechanism capable of enabling position determination by triangulation or another such approach. The device 600 in at least some embodiments can also include a separate communication mechanism 614, such as a cellular or wireless network connection operable to communicate information with a trip planning service or other remote such entity. It should be understood that in some embodiments the location-determining mechanism and communication mechanism might be, or include, the same or similar component(s). As known in the art, the current location of the device 600 can be used to update the directions to the next destination, such as when the user makes a wrong turn, makes an unplanned stop, or otherwise deviates from the prior directions. In various embodiments, this information can also be used to update the time information presented to the user as part of the trip plan, and can be used to modify the trip information itself as discussed elsewhere herein.

Figure 6B:
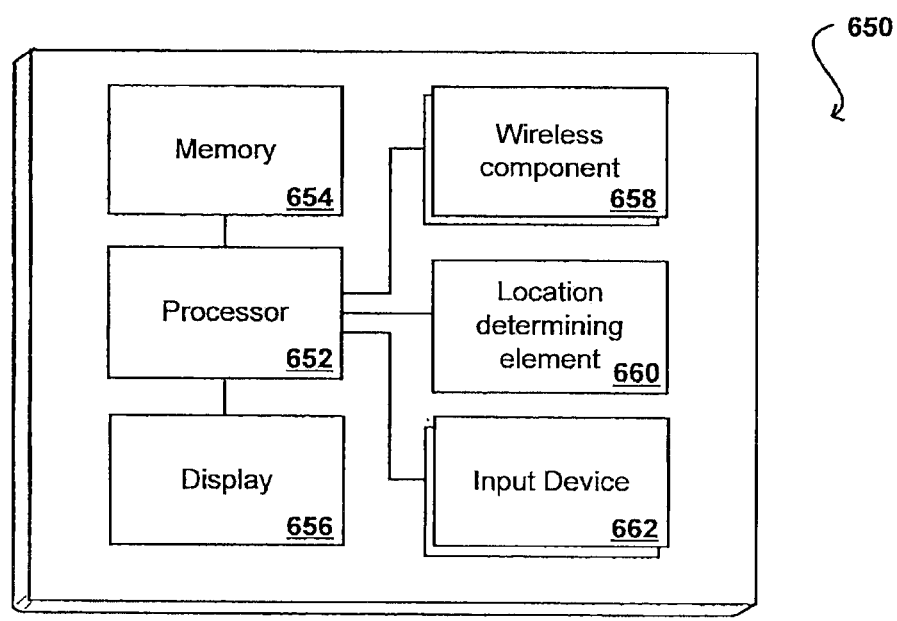

FIG. 6(b) illustrates an example component-level view 650 of such a computing device in accordance with various embodiments, which can be used to provide various functionality described herein. In this example, the device includes at least one central processor 652 for executing instructions that can be stored in at least one memory device or element 654. As would be apparent to one of ordinary skill in the art, the device can include many types of memory, data storage, or non-transitory computer-readable storage media, such as a first data storage for program instructions for execution by the processor 652, the same or separate storage for images or data, a removable storage memory for sharing information with other devices, etc. The device typically will include at least one type of display element 656, such as a touch screen, electronic ink (e-ink), organic light emitting diode (OLED) or liquid crystal display (LCD), although devices might convey information via other means, such as through audio speakers. In at least some embodiments, the display screen provides for touch or swipe-based input using, for example, capacitive or resistive touch technology.

As discussed, the device in many embodiments will include at least one wireless communication component 658, such as a cellular network component, wireless Internet component, Bluetooth® mechanism, WLAN connector, and the like. Such a component can enable the device to talk with devices, systems, or services over at least one network, and in some embodiments communicate directly with other computing devices and/or accessories. Further, the device can include at least one location determining component 660, such as may include a GPS element, accelerometer, electronic gyroscope, inertial sensor, and the like. Such a component can help to determine a present location of the device, as well as speed and/or acceleration information that can help to predict a location of the device when an accurate determination cannot be made, such as when the device is in a tunnel and no GPS information can be obtained. As mentioned, there can be other elements as well, such as at least one image capture element for use in determining gestures or motions of the user, determining information about the location of the device, etc. An image capture element can include, or be based at least in part upon any appropriate technology, such as a CCD or CMOS image capture element having a determined resolution, focal range, viewable area, and capture rate. The device also can include at least one lighting element, as may include one or more illumination elements (e.g., LEDs or flash lamps) for providing notifications and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
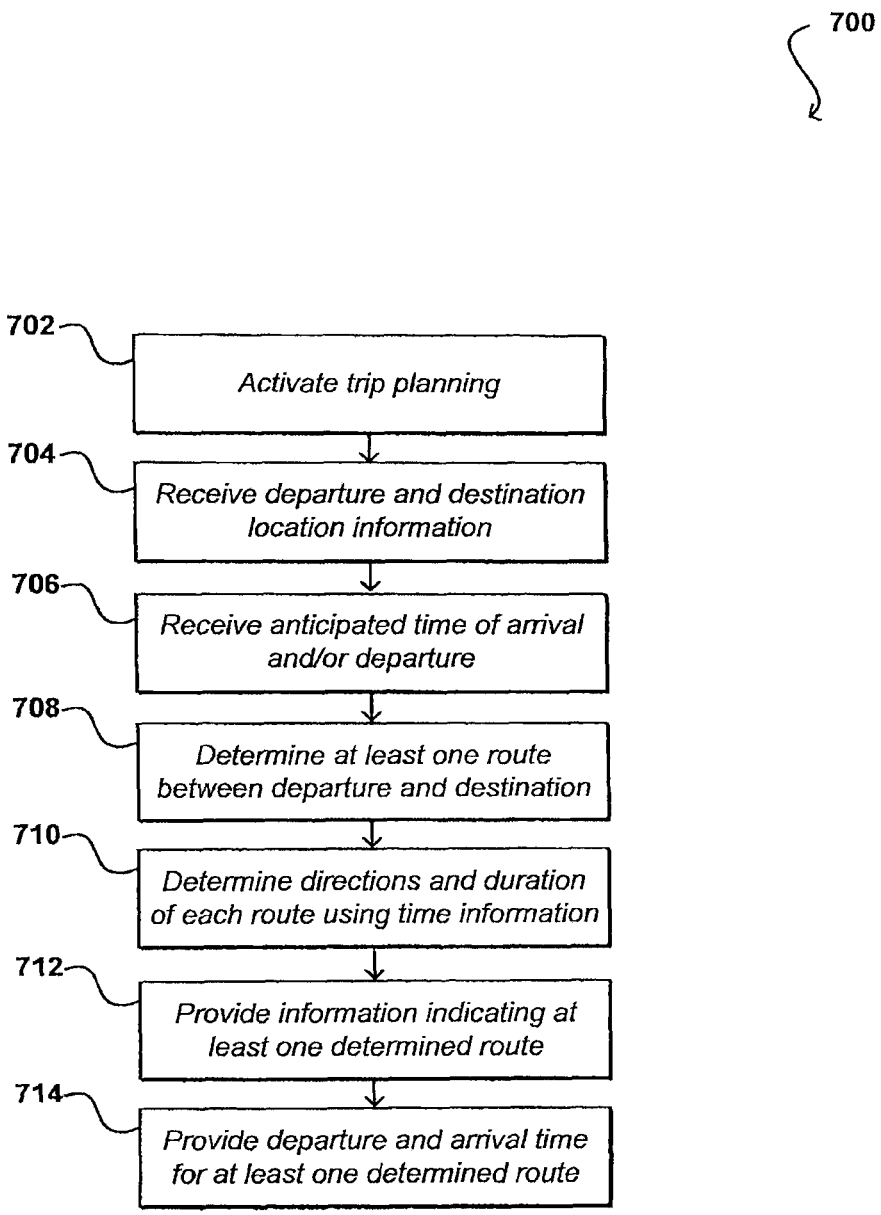
FIG. 7 illustrates an example process for providing time-inclusive direction information in accordance with at least one embodiment.

FIG. 7 illustrates an example process for obtaining time-inclusive route information that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a trip planning application or interface is activated 702, such as by a user launching an application on a client device or accessing a planning interface through a Web browser. As part of the trip planning, one or more user selectable elements are provided to a user as part of a graphical user interface, for example, that enable the user to input, select, or otherwise specify various types of information to be used in planning a trip, getting route directions, and performing similar functions. In one example, information regarding a departure location and a destination location is received 704, such as by a user inputting the information into one or more text boxes or pointing to one or more locations on an electronic map. In addition, an anticipated time of departure and/or a target time of arrival can be received 706. In some examples a user might want to leave at a certain time or arrive at a certain time, without necessarily caring about the other time. In other embodiments, a user might want specific arrival and departure times, and might use the trip planner to determine how much time the user has between departure and arrival to stop at one or more locations. Various other uses or intentions can be supported as well.

Upon receiving at least a departure location, an arrival location, and a time of arrival or departure, at least one route between the departure can destination locations is determined 708. Various types of information can be used to determine which of these routes should be suggested to the user and, in at least some embodiments, in what order. As discussed, the time information specified by the user can be used in determining one or more appropriate routes, as different sections of roadway may have different average speeds of travel at different times of day, which can change the route that is the fastest throughout the course of a day. For at least a portion of the selected routes, information such as the directions and the duration of a given route are determined 710, in order to rank and or select the various routes according to one or more criteria, such as shortest distance, shortest time, most use of freeways, and the like. Upon making such a ranking and/or determination, information for at least one route is provided for display to a user 712. In some embodiments the route most closely meeting one or more criteria will be selected, while in other embodiments the top two or three routes might be suggested based on any of a number of criteria known or used for such purposes. For each of the suggested routes, an estimated departure and arrival time can be presented as well 714, which can enable the user to select a route further based at least in part upon the time that the user would have to leave and/or the time the user would arrive, based on the estimation. Estimated times can be determined using any approach discussed or suggested herein, such as by aggregating the amount of time the user is likely to spend on any segment of the route based at least in part upon the posted speed limit, number of traffic lights or stop signs, and any speed information related to traffic at certain times of day, etc.

Figure 8:
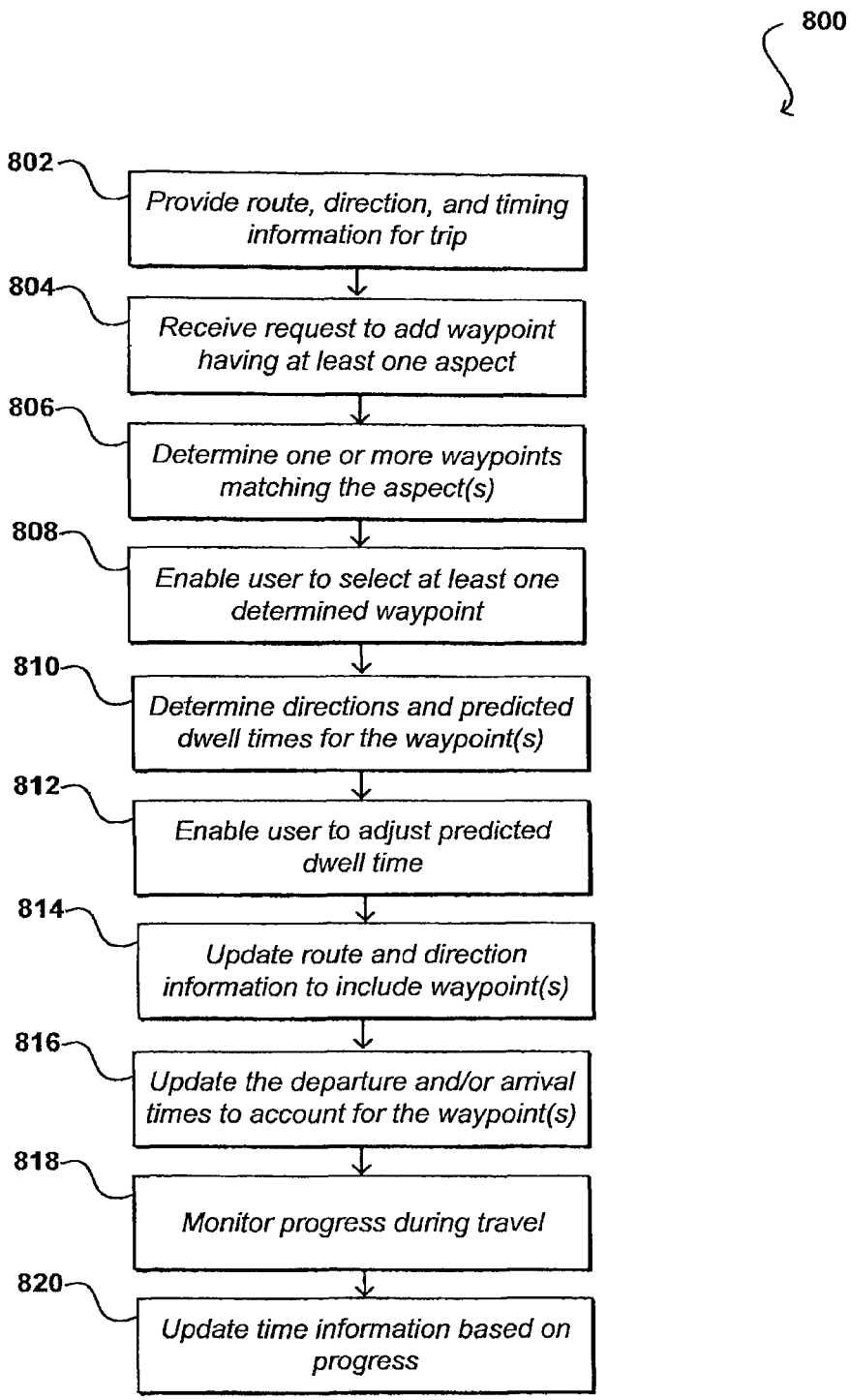
FIG. 8 illustrates an example process for providing time-inclusive direction information in accordance with at least one embodiment.

FIG. 8 illustrates an example process 800 for generating and/or utilizing a trip plan based on a determined route, such as that determined using a process similar to that described with respect to FIG. 7. In this example, route, direction, and timing information for a trip are provided 802, such as in response to a user entering information and then selecting a suggested route as discussed above. As discussed, this can include turn-by-turn directions in at least some embodiments, with timing information being presented for the time of departure and time of arrival for the selected route. A user might want to add one or more stops, locations, or other waypoints along the route. A request to add at least one waypoint can be received 804, with the request specifying at least one aspect to be used in determining an appropriate waypoint. The at least one aspect can include, for example, a type of stop, a time for the stop, a relative location for the stop (e.g., in a town or within a given radius from a point or address), or other such information discussed or suggested herein. Upon receiving the request, one or more waypoints having or substantially matching the at least one aspect can be determined 806, and information for at least one of these waypoints can be presented to the user. The information can include, for example, mapping information indicating a relative location of the waypoint, a description of the waypoint, etc. The user can be enabled to select one or more of the determined waypoints 808, such as by clicking on a link, pressing on an icon associated with the waypoint, or performing another such action. Additional directions can be determined for each selected waypoint, which may affect at least some of the previously determined directions, as well as a predicted dwell time for the waypoint 810. As discussed, a predicted dwell time can be determined using any appropriate information, such as a typical amount of time spent at a type of location, an average amount of time spent by the user at that type of location, etc. In at least some embodiments, the user can be enabled through an interface to adjust the predicted dwell time, such as to decrease the anticipated dwell time where the user is going to get a meal "to go," or increase a dwell time when the user wants to use the stop to rest or take a break. Various other reasons for adjusting the time can apply as well as should be apparent in light of the present disclosure.

As discussed, a user might enter multiple waypoints of one or more types along a journey. These can include restaurants, hotels, gas stops, and various other types of waypoints as discussed above. For each of these waypoints, the route and direction information can be updated to include these waypoints 814. Further, the departure and arrival times can be updated based on the inclusion of the waypoints 816, including the dwell times and additional driving time for each waypoint. In cases where a waypoint will affect the arrival or departure time for at least a respective portion of the journey, the user can be prompted as to which time should be changed, or whether both should be adjusted by a certain amount. For example, if the waypoint will add an hour to the trip, the user can specify to make the time of departure an hour earlier, the time of arrival an hour later, adjust each by thirty minutes, or make another such adjustment. In at least some embodiments, a departure and arrival time for each waypoint can also be adjusted as necessary. As mentioned, a user can be notified if an added waypoint will cause the user to either have to change a specified time of arrival or departure, or to have to drop an existing waypoint to keep the approximate departure and arrival times.

In at least some embodiments, the user (or another user having access) can access the trip plan during the trip. For example, a user might use a computing device with the trip plan to obtain navigation directions in real time, or might want to determine when and where the next stop will be. In such cases, the computing device (or a system or service in communication with the computing device) can monitor the progress of the user according to the trip plan 818. For example, a navigation system can update directions based on GPS data or a trip planning service can track the location of a computing device using triangulation or another appropriate device location approach. In at least some embodiments, the information for the trip plan can be updated in real time 820 based on any appropriate information. For example, the user might make additional stops or take an alternative route that might cause the time of arrival and direction information to change. The user might also add or remove a waypoint from the plan during the trip, which can cause the information to update accordingly. Various other changes can affect the trip plan as well as should be apparent to one of ordinary skill in the art in light of the teachings and suggestions contained herein.

As discussed above, such functionality could be offered as a Web service, via a Web site, through a stand alone application, or through another such mechanism. In some embodiments, the trip planning functionality can be provided as a plug-in or other component operable to work with an existing mapping application. For example, a user might have a preferred mapping application based on accuracy, comfort with the interface, or any of a number of other such reasons. Instead of forcing the user to learn a new interface and/or adjust to a new type of result, a trip planning application or service can work with the existing mapping application to enable the user to add waypoints, obtain reservations, get timing information, or obtain any functionality provided by a trip planning application, but get these in the context of the existing mapping application. For example, the user can enter waypoints and trip plan information through a trip planning plug-in, and an associated trip planning module or service can submit requests or otherwise interact with the mapping application such that the waypoints are added to the map and/or directions of the mapping application. Additional information, such as timing information, can be provided by the trip module, which might reside in a section or portion of the mapping application interface, or might exist as a separate interface, etc. Various other possibilities fall within the scope of the various embodiments, such as where a user is able to use a preferred traffic system, GPS data, text editor, or other application or service to provide information to a trip planning system and/or export trip information to a calendar application, task service, or other such application or service.

As mentioned, the user can also request to receive suggestions for points of interest or other waypoints along the trip. These suggestions can be delivered through the trip planning interface, or can be delivered through any other appropriate mechanism, such as by text message or instant message. In some embodiments, a user can be provided with deals, coupons, or offers for places along the route, which can be provided to the user in similar ways. In some cases, a user could receive a barcode or similar element that can be scanned or otherwise read by a device at a particular location to obtain an offer. Upon indicating interest in an offer, that waypoint can be automatically added to the trip plan. In addition to providing offers, various hotels, restaurants, or other waypoints can also advertise with the trip planner in at least some embodiments, where these ads are available through the trip planning interface or can even be pushed to the user where the user has expressed interest in receiving certain types of marketing material. Such advertising can help the trip planning service to be offered to users at little or no cost.

In at least some embodiments, a user can also specify information about the people that will be traveling with that user when the user takes that trip or travels along a specified route. For example, user might be able to specify whether the user is going alone, with friends, with a significant other, or with children. In some embodiments, the user can specify the specific people that can be going along. Such information can be used by the trip planning application or service to attempt to suggest more appropriate waypoints. For example, point of interest suggestions might be different if the user is traveling with children than with adults only. Similarly, the suggestions might be different if the travelers are all of a similar age range or gender, or have expressed certain interests. In embodiments where at least some of the travelers have data available, this data can be analyzed to attempt to make recommendations based on the data for the various travelers. For example, if the travelers are all vegetarians then the restaurants suggestions might be adjusted accordingly. If one traveler typically stops for a restroom break every hour based on historical information, then the trip plan can add in restroom breaks as appropriate. If one user has expressed an interest in visiting a certain location, this suggestion can be provided along with information indicating who want to visit that location. Various other information about the users can be combined for various purposes as well within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of generating a trip plan, comprising:
   receiving information specifying a departure location, a destination location, and time information, the time information indicating a time at which a user intends to at least depart the departure location or arrive at the destination location;
   obtaining, using one of at least one computing system, one or more potential route options between the departure location and the destination location;
   selecting at least one route option using at least one route selection criterion;
   determining, using one of the at least one computing system, an estimated time of departure and an estimated time of arrival for the at least one route option based at least in part upon the received time information;
   providing information for the at least one route option, and the estimated times of departure and arrival for the at least one route option, for display to the user;
   receiving confirmation of a confirmed route option of the at least one route option;
   providing information for at least one suggested waypoint for display to the user based at least in part upon timing information associated with the confirmed route option, the waypoint meeting at least one waypoint suggestion criteria corresponding to the timing information associated with the confirmed route option, the information for the at least one suggested waypoint including at least a respective estimated time of departure and a respective estimated time of arrival for the at least one suggested waypoint;
   receiving confirmation of a confirmed waypoint of the at least one suggested waypoint;
   receiving from the user a selection as to whether to change the estimated time of departure or the estimated time of arrival of the confirmed route option to account for the confirmed waypoint;
   determining, using one of the at least one computing system, updated trip information including updated route information, information for the confirmed waypoint, and at least one of an updated time of departure or an updated time of arrival; and
   providing the updated trip information for display to the user.

2. The computer-implemented method of claim 1, further comprising:
   tracking a position of a computing device associated with the user during a time of the trip plan; and
   providing navigation directions to the computing device based at least in part upon the tracked position.

3. The computer-implemented method of claim 1, further comprising:
   updating the trip information in response to changes in the tracked position of the computing device with respect to an estimated location of the computing device according to the trip information.

4. The computer-implemented method of claim 1, further comprising:
   enabling the user to add or remove waypoints while following the trip information; and
   automatically updating the trip information to account for the addition or removal of the waypoint.

5. A computer-implemented method of providing navigation directions, comprising:
   under control of one or more computer systems configured with executable instructions,
   receiving a request for directions between a departure location and a destination location;
   receiving timing information specifying at least one of a target time of departure and a target time of arrival;
   obtaining one or more route options between the departure location and the destination location;
   selecting at least one route option based on at least one selection criteria;
   determining a departure time and an arrival time for the at least one selected route based at least in part upon the received timing information;
   determining at least a suggested waypoint based at least in part on the received timing information;
   providing information for the at least the suggested waypoint to the user, the user being able to select the at least the suggested waypoint to be added to the at least one selected route, the information for the at least the suggest waypoint including at least a respective estimated time of departure and a respective estimated time of arrival for the at least the suggested waypoint; and
   providing information for the at least one selected route and the departure and arrival times for the at least one selected route for display to a user,
   wherein the user is able to confirm one of the at least one selected route based at least in part upon the displayed departure and arrival times for the at least one selected route.

6. The computer-implemented method of claim 5, further comprising:
   receiving a request to add a waypoint to the confirmed route, the request specifying at least one criteria for the waypoint;
   determining one or more waypoints satisfying the at least one criteria; and
   providing information for the one or more waypoints to the user,
   wherein the user is able to select at least one waypoint to be added to the confirmed route.

7. The computer-implemented method of claim 6, further comprising:
   receiving confirmation of the at least one selected waypoint;
   determining updated directions for the confirmed route to include each selected waypoint;
   determining a default dwell time for each selected waypoint;
   determining a time of arrival and a time of departure for each selected waypoint; and
   providing updated information for the confirmed route including the updated directions, as well as the default dwell time, the time of arrival, and the time of departure for each selected waypoint.

8. The computer-implemented method of claim 7, wherein the user is able to adjust the dwell time for each selected waypoint, the adjusted dwell time causing at least one of the time of arrival or time of departure for the selected waypoint to be adjusted accordingly.

9. The computer-implemented method of claim 6, further comprising:
   adjusting at least one of the arrival time and the departure time for the confirmed route based on the selected at least one waypoint.

10. The computer-implemented method of claim 9, further comprising:
prompting the user to confirm whether to adjust the arrival time or the departure time for the confirmed route, or a combination thereof, in response to the selected at least one waypoint.

11. The computer-implemented method of claim 6, further comprising:
automatically making a reservation at a determined one of the selected waypoints when a reservation is available or required at the determined waypoint.

12. The computer-implemented method of claim 6, further comprising:
determining whether to suggest a type of waypoint for the confirmed route based at least in part upon a length of the confirmed route.

13. The computer-implemented method of claim 6, wherein the one or more waypoints are further determined using at least one of historical data, preference data, and behavioral data for the user.

14. The computer-implemented method of claim 6, wherein the user is able to specify information about one or more persons joining the user on the confirmed route, the one or more waypoints being further determined using the specified information about the one or more persons.

15. The computer-implemented method of claim 5, wherein the at least one route criteria includes at least one of a shortest time, a shortest distance, a least amount of traffic, and most use of freeway.

16. A navigation device, comprising:
a processor;
a display element;
a location determining element; and
a memory device including instructions that, when executed by the processor, cause the navigation device to:
receive a request for directions between a departure location and a destination location, the request further specifying at least one of a target time of departure and a target time of arrival;
determine one or more route options between the departure location and the destination location, as well as a departure time and an arrival time for the one or more route options based at least in part upon the received timing information;
enable a user to select one of the one or more route options as a trip plan based at least in part upon the departure time and arrival time for the selected route option;
receive a request to access navigation information for the trip plan;
determine a current location of the navigation device using the location determining element;
determine at least a suggested waypoint based at least in part on the timing information associated with the selected route option;
display information associated with the at least a suggested waypoint to the user on the display element, wherein the user is able to select the at least a suggested waypoint to be added to the route plan, the information associated with the at least the suggested waypoint including at least a respective estimated time of departure and a respective estimated time of arrival for the at least the suggested waypoint; and
provide route directions and timing information for the route plan on the display element based at least in part upon the determined current location, the navigation device being configured to update at least one of the route directions and timing information based on the current location.

17. The navigation system of claim 16, further comprising a communication mechanism operable to connect to at least one network, and wherein the instructions when executed further cause the navigation device to:
receive a request to add a waypoint to the selected route, the request specifying at least one criteria for the waypoint;
send a request for suggested waypoint information using the communication mechanism, the request including the at least one criteria;
receive suggested waypoint information including information for one or more waypoints matching the at least one criteria; and
display at least a portion of the suggested waypoint information to the user on the display element,
wherein the user is able to select at least one waypoint to be added to the confirmed route.

18. The navigation system of claim 17, wherein the instructions when executed further cause the navigation system to:
determine updated directions for the selected route to include each selected waypoint;
determine a time of arrival, a time of departure, and a dwell time for each selected waypoint; and
provide updated information for the selected route including the updated directions, as well as the default dwell time, the time of arrival, and the time of departure for each selected waypoint.

19. The navigation system of claim 18, wherein the instructions when executed further cause the navigation system to:
prompt the user to confirm whether to adjust the arrival time or the departure time for the selected route, or a combination thereof, in response to the selected at least one waypoint; and
in response, adjust at least one of the arrival time and the departure time for the confirmed route.

20. The navigation system of claim 18, wherein the instructions when executed further cause the navigation system to:
enable the user to request at least one of suggestions and offers for waypoints along the selected route.

21. The navigation system of claim 17, wherein the one or more route options are determined based at least in part upon relative travel times for each route option based at least in part upon traffic patterns for the time of day at which the user is determined to be traveling upon various portions of each route option based at least in part upon the received timing information.

22. A non-transitory computer-readable storage medium storing instructions for providing location-specific information, the instructions when executed by a processor causing the processor to:
receive a request for directions between a departure location and a destination location, the request further specifying at least one of a target time of departure and a target time of arrival;
obtain one or more route options between the departure location and the destination location based on at least one selection criteria;
determine a departure time and an arrival time for determined one or more route options based at least in part upon the received timing information;
provide information for the determined one or more route options, including the departure and arrival times for each route option, for display to a user, the user being enabled to select one of the route options based at least in part upon the departure and arrival times;

receive a request to add a waypoint to the selected route option, the request specifying at least one criteria for the waypoint;

determine one or more waypoints based at least in part on the timing information and the at least one criteria;

provide information for the one or more waypoints to the user, the user being enabled to select at least one waypoint to be added to a confirmed route, the information for the one or more waypoints including at least a respective estimated time of departure and a respective estimated time of arrival for the at least one waypoint; and automatically update at least one of the departure time and the arrival time for the selected route option for each added waypoint.

23. The computer-readable storage medium of claim 22, wherein the instructions, when executed, further cause the processor to:

provide a suggestion to the user to drop an existing waypoint or select a new waypoint based at least in part upon a current position of the user along the trip plan, the user being ahead or behind a scheduled amount of progress by more than a determined amount for the existing waypoint.

24. The computer-readable storage medium of claim 22, wherein the instructions, when executed, further cause the processor to:

access an existing mapping application specified by the user; and provide the departure location and the destination location to the existing mapping application, wherein the one or more route options are obtained from the existing mapping application, and wherein a mapping portion of the existing mapping application is accessible to generate mapping information for display to the user.

25. The computer-readable storage medium of claim 22, wherein the instructions, when executed, further cause the processor to:

provide one or more suggestions to the user based at least in part upon information for the selected route option, the one or more suggestions offering at least one of products and services related to at least one aspect of the selected trip option.

\* \* \* \* \*